Jan. 24, 1961 P. R. SCHMITZ 2,969,173

NON-INTERFERING TAPE FEED OUT FOR TELEGRAPH REPERFORATOR

Filed April 29, 1958 2 Sheets-Sheet 1

INVENTOR
PAUL R. SCHMITZ

BY R. C. Perry

ATTORNEY

Jan. 24, 1961 P. R. SCHMITZ 2,969,173

NON-INTERFERING TAPE FEED OUT FOR TELEGRAPH REPERFORATOR

Filed April 29, 1958 2 Sheets-Sheet 2

INVENTOR
PAUL R. SCHMITZ

BY R. C. Perry

ATTORNEY 2,969,173

NON-INTERFERING TAPE FEED OUT FOR TELEGRAPH REPERFORATOR

Paul R. Schmitz, Elmhurst, Ill., assignor to Teletype Corporation, Chicago, Ill., a corporation of Delaware Filed Apr. 29, 1958, Ser. No. 731,742

8 Claims. (Cl. 234—22)

Figure 1:
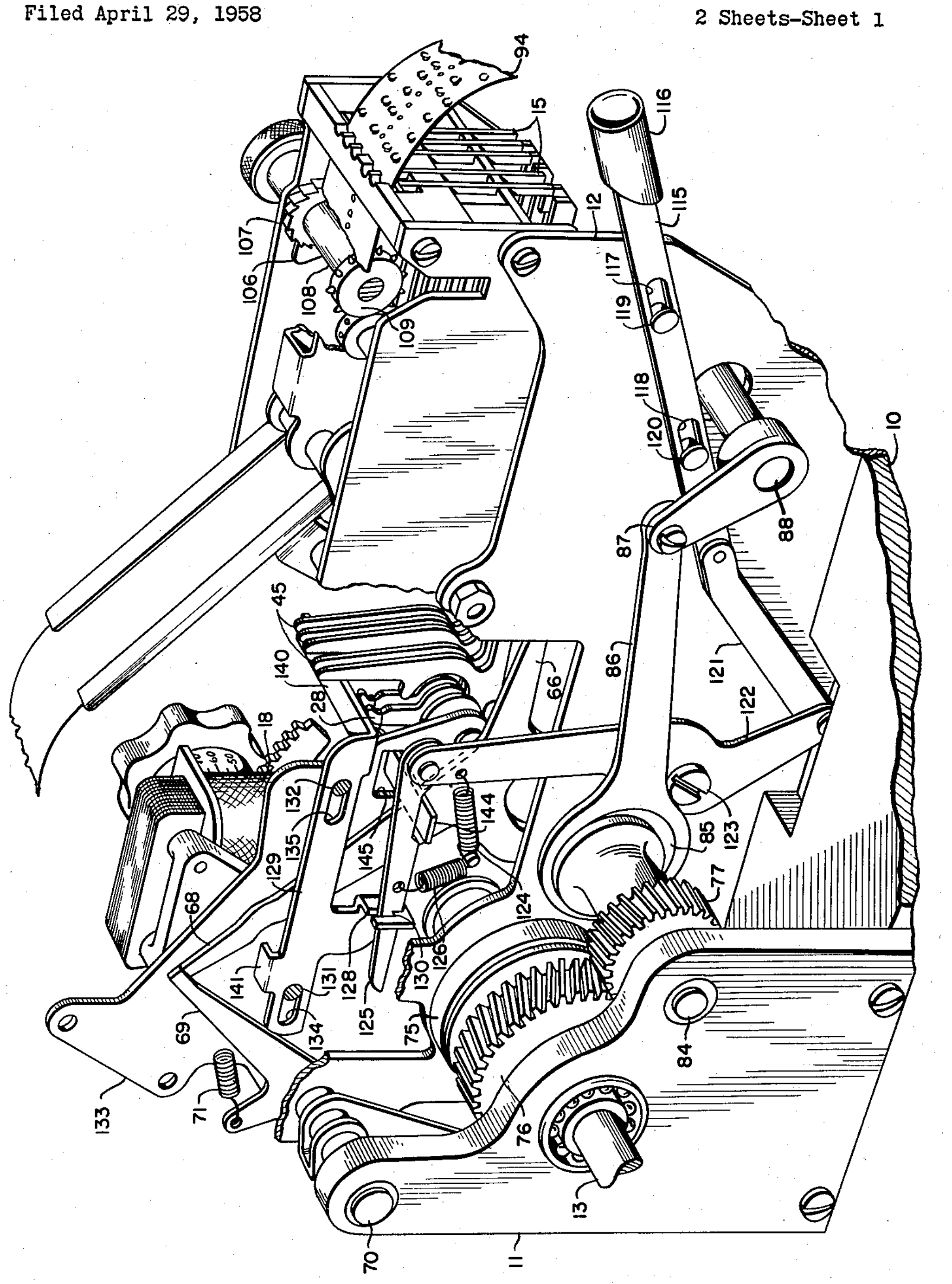

This invention relates to a tape feed-out mechanism for a printing telegraph tape reperforator and more particularly to a letters punching feed-out mechanism for a reperforator that will not interfere with the control of the reperforator by incoming signals.

It is an object of the present invention to provide a simple tape feed-out mechanism for a printing telegraph tape reperforator that will not interfere with the control of the reperforator by incoming signals.

Another object of the invention is to provide a tape feed-out mechanism for a printing telegraph tape reperforator that may be controlled at the reperforator at all times that no signals are being received by the reperforator.

Still another object of the invention is to provide a tape feed-out mechanism for a printing telegraph tape reperforator that will not interfere with the operation of the reperforator in response to incoming signals, and that will cause the tape being fed to be perforated with a predetermined code combination.

A further object of the invention is to provide a simple non-interfering tape feed-out mechanism for a printing telegraph reperforator that may be manually controlled.

In accordance with one embodiment of the invention, a reperforator having a cyclically operable signal controlled selector mechanism, for controlling a plurality of interposer members permutatively to select punches individual to the interposers for operation and also having a tape feeding mechanism for feeding the tape step by step on each cycle of operation of the selector mechanism, is provided with a trip lever for actuating the tape feeding mechanism, which trip lever is actuated each time a signal is received in the selector mechanism and may be operated independently of incoming signals to cause tape to be fed out of the reperforator so long as the trip lever is held operated and so long as no signals are received in the perforator. Upon its operation independently of signals incoming to the selector means, the reperforator is caused to perforate a code combination of holes in the tape representing a letters signal.

In the embodiment of the invention illustrated herein, the tape feed-out is applied to a printing telegraph reperforator of the type disclosed in detail in the co-pending application of R. E. Arko and C. W. Swan, Serial No. 725,935, filed April 2, 1958. In the reperforator disclosed in the afore-mentioned application, there is provided a cyclically operable signal controlled selector mechanism for controlling a plurality of interposer members permutatively selectable by the selector mechanism to control punches individual to each interposer. The punches, upon being selected, are actuated by a punch actuator and a mechanism is provided for feeding the tape step by step through the apparatus in timed relationship to the signal controlled selection of the punches for actuation.

Figures 2, 3:
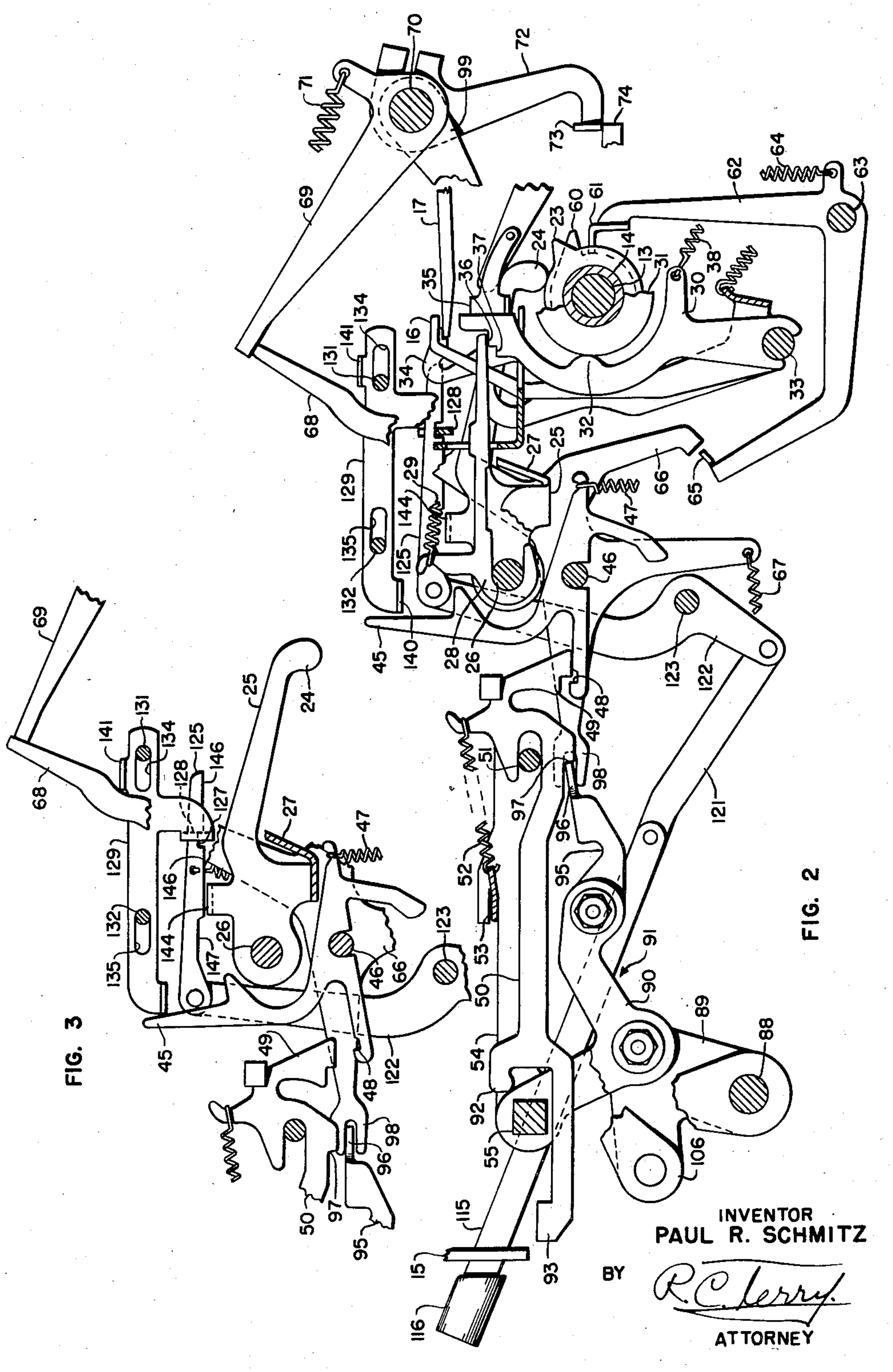

A complete understanding of the invention may be had by reference to the following detailed description when considered in conjunction with the accompanying drawings wherein:

Fig. 1 is a rear perspective view of a printing telegraph reperforator which includes the tape feed-out mechanism of the present invention, parts being broken away to illustrate more clearly the apparatus of the present invention;

Fig. 2 is a longitudinal view, through a reperforator equipped with mechanism as covered by the present invention, looking toward the rear of the apparatus, supporting structures and other structural elements not essential to an understanding of present invention not being shown in the view; and Fig. 3 is a fragmentary view of a portion of the apparatus, shown in Fig. 2, showing the tape feed-out mechanism in a different operative position from that shown in Fig. 2.

Referring now to the drawings wherein like reference characters designate the same parts in the several views, particular reference being had at this time to Fig. 1, it will be noted that the reperforator apparatus as shown herein does not have a printing mechanism associated with it such as is disclosed in the aforementioned application of R. E. Arko and C. W. Swan. However, the mechanism for selecting and actuating the punches in the apparatus is the same as that shown in the Arko and Swan application with the exception that the oscillatory shaft that drives the punch actuating mechanism is driven by an eccentric rather than by a surface cam.

*Selecting and perforating mechanism*

In Fig. 1 there is shown a base 10 having, extending upwardly from it a rear bearing plate 11 which, together with an intermediate plate 12, supports a main power shaft 13. As described in detail in the aforementioned application of Arko and Swan, the main power shalt 13 is driven continuously and has on it, two clutches, one of which is operable to connect a selector mechanism including a selector cam sleeve 14 to the shaft 13 for rotation thereby. To select punches 15 for actuation, the clutch (not shown herein but designated by the reference numeral 32 in said application of Arko and Swan) for connecting the main power shaft to the selector cam sleeve 14 is rendered effective by a start lever 16 that will trip the clutch and interconnect the shaft 13 with the selector cam sleeve 14 upon the receipt in the apparatus of a spacing signal. This will result in an armature 17 being released by its electromagnet 18, thus to initiate a cycle of rotation of the selector cam sleeve 14 and the subsequent selection of punches 15 in accordance with the signal received in the apparatus. The selector cam sleeve 14 will be driven through one cycle of rotation and will then be disconnected from the main power shaft 13 at the completion of the cycle of rotation. As the selector cam sleeve 14 starts to rotate, the first operation it performs is the restoration of the apparatus into condition to receive the incoming code combination of signals. This is effected by the cam projection 23, engaging a cam follower portion 24 of a reset bail lever 25.

The reset bail lever 25 is oscillatable about a stationary shaft 26 and has a web portion 27 for engaging the underside of a group of push levers 28. The push levers 28 are not only oscillatable about the shaft 26, but due to the configuration of them, they are also slidable on the shaft 26 and the push levers 28 are urged to move to the right and in a clockwise direction by coil springs 29 individual to them. There are five of the push levers 28 provided in the apparatus and the push levers are individually associated with five selector cam levers 30 that are in turn individually associated with five selector cams 31 fixed to the selector cam sleeve 14.

Each of the selector cam levers 30 is provided with a cam follower portion 32 that will drop into an indentation (not shown) on its associated selector cam if a marking signal is received by the electromagnet 18 at the time that the cam follower portion 32 is aligned with the indentation in the selector cam 31. The selector cam levers 30 are oscillatable about a pivot shaft 33 which also supports for oscillation, a spacing lock cam lever 34 and a marking lock cam lever 35 which are either blocked from operation or permitted to operate by the armature 17 upon the receipt in the apparatus of a spacing or a marking signal respectively. Each of the selector cam levers is provided with a stepped upper surface comprising upper and lower push bar engaging shoulders 36 and 37, respectively. The selector cam levers 30 are individually urged to rock in a clockwise direction about the shaft 33 by contractile springs 38 individual to them.

When a marking signal is received at a time when the cam follower portion 32 of a selector cam lever is opposite the indentation in its associated selector cam 31, the selector cam lever will rock to the right from the position shown, to permit the right-hand end of the push lever 28, associated with it, to drop down onto the lower shoulder 37 from the upper shoulder 36. As soon as the indentation in the selector cam 31 passes the cam follower portion 32 of its respective selector cam lever, the push lever 28, which has dropped down onto the lower push bar engaging shoulder 37, will have its right end engaged by the vertical portion of the selector cam lever and will be moved to the left from the position shown in Fig. 2. Once the right end of the push lever 28 has dropped down onto the shoulder 37, it will remain in that position until it is rocked about the shaft 26 by the web portion 27 of the reset bail lever 25.

Each of the push levers 28 has associated with it, a selector slide latch 45 pivoted on a stationary shaft 46 and urged to rock about the shaft 46 in a clockwise direction by contractile spring 47 individual to the latch. When one of the push levers 28 is moved to the left by its associated cam lever 30, the lever will rock its associated selector slide latch 45 in a counterclockwise direction about the shaft 46, thereby to move a latching shoulder 48 on the slide latch out of latching engagement with a latching portion 49 of a punch selector slide 50. Each of the selector slide latches 45 has individual to it, a punch selector slide 50 which is slidable on and oscillatable about a fixed shaft 51, and which slide 50 is urged to move to the left by a contractile spring 52 individual to it. The springs 52 are attached to a crossbar 53 which is suitably fastened to two arms 54 that are interconnected by a crossbar 55 to form a punch selector slide actuating bail. The arms 54 are also pivotally mounted on the shaft 51 so that they may oscillate about it.

In the normal operation of the apparatus in receiving incoming signals, the selector cam sleeve 14 will, once in each cycle of operation of it and near the end of its cycle of operation, carry a camming projection 60 into engagement with a cam follower portion 61 of a function clutch cam lever 62 to rock the cam lever 62 about a stud shaft 63 in a clockwise direction.

The function clutch cam lever 62 is normally urged to rock in a counterclockwise direction about the stud shaft 63 by a contractile spring 64, but when the lever is rocked clockwise by the camming projection 60, the lever will move a transversely disposed portion 65 into engagement with a four-armed trip lever 66 to rock the lever 66 in a counterclockwise direction about the stationary shaft 46 on which the lever 66 is oscillatably mounted. The trip lever 66 is normally urged to rock in a clockwise direction about the shaft 46 by a contractile spring 67. One arm 68 of the lever 66 is normally held in position to hold a lever 69 in the position shown in Fig. 2.

The lever 69 is fixed to an oscillatable shaft 70 and the shaft 70 and lever 69 are normally urged to rock in a counterclockwise direction by a contractile spring 71. The shaft 70 also has fixed to it, a clutch tripping lever 72 which, when the lever 69 and lever 72 are in the position shown in Fig. 2, will hold a horizontally disposed portion 73 of the lever 72 in blocking engagement with a clutch shoe lever 74. The clutch shoe lever 74 normally holds a clutch 75 (Fig. 1) inoperative to connect a gear 76 with the main power shaft 13. However, when the clutch tripping lever 72 is moved out of blocking engagement with the clutch shoe lever 74, the clutch 75 will become effective to clutch the gear 76 to the shaft 13 for a portion of one cycle of rotation of the shaft 13 which portion is sufficient to drive a gear 77, in mesh with the gear 76, through one complete revolution.

The gear 77 is mounted upon a shaft 84 that carries an eccentric drive 85 on it for imparting reciprocation to an arm 86. The right end (Fig. 1) of the arm 86 is pivotally attached to a lever 87 which is in turn fixed to a rock shaft 88. The oscillatable shaft or rock shaft 88 will thus be oscillated once for each cycle of rotation of the gear 77. The rock shaft 88 carries on it a bell crank lever 89 (Fig. 2). The bell crank lever 89 has pivotally fixed to it a second bell crank lever 90 forming part of a toggle mechanism designated generally by the numeral 91. One arm of the bell crank lever 90 is pivotally attached to the crossbar 55 whereby, upon oscillation of the shaft 88, the bell crank 89 and bell crank 90 will cause the crossbar 55 to be moved upwardly and then downwardly to the position shown in Fig. 2.

Any of the punch selector slides 50 which have been selected and released by their asociated selector slide latches 45, will have been moved to the left (Fig. 2) by the associated contractile springs 52 until a shoulder 92 on each slide is over the crossbar 55. Consequently, those punch selector slides 50 which are selected under control of the selector mechanism will be moved to the left to carry a head portion 93 on the selected slide 50 into position beneath its associated punch 15 and consequently when the crossbar 55 is moved upwardly, the slides 50 which have been selected will actuate their associated punches 15 to cause them to perforate a strip of tape 94, Fig. 1.

The second arm of the bell crank lever 90 has pivotally attached to it a slide restoring bail 95 having a web 96 on it for engagement with shoulders 97 formed on each of the punch selector slides 50. The web 96 extends into a forked end 98 of one of the arms of the four-armed lever 66 and when the lever 66 is rocked in a counterclockwise direction (Fig. 2), the arm 68 of the four-armed lever 66 will move out from under the lever 69 which will thereupon be rocked by its spring 71 into position to block the return of the arm 68 to the position shown in Fig. 2 until the lever 69 is oscillated clockwise out of the path of the end of the arm 68 by a restoring lever 99 which is described in detail in the aforementioned co-pending application of R. E. Arko and C. W. Swan. When the four-armed lever 66 is held in the position shown in Fig. 3 by the lever 69, the forked portion 98 of the lever 66 will hold the web 96 down out of engagement with the shoulders 97 on the punch selector slides 50. However, as soon as the restoring lever 99 oscillates the shaft 70 clockwise to release the arm 68 of the four-armed lever 66, the lever 66 will rock its forked end up to engage the web 96 with the shoulders 97 so that as the shaft 88 is oscillated clockwise, the web 96 will push all of the punch selector slides that have been released by their respective selector slide latches 45 back to position to be latched by the latching shoulders 48 on the selector slide latches.

The bell crank lever 89 has pivotally attached to it a tape-feeding pawl 106, portions of which are shown in Figs. 1 and 2, for engagement with a tape-feed ratchet 107 that is mounted on a shaft 108 that also carries a tape-feed wheel 109. Therefore, each time the rock shaft 88 is oscillated, the tape 94 will be fed forward one step to present a fresh area of it to the punches 15. Thus, each time the clutch 75 is tripped, the tape 94 will be fed forwardly one step.

*Tape feed-out means*

The apparatus described thus far controls the perforation of the tape 94 in response to signals incoming to the electromagent 18. However, it is sometimes desirable to feed out tape from the apparatus for various purposes when no signals are being received by the reperforator. The mechanism for effecting this operation will now be described in detail.

The tape feed-out mechanism includes a keylever 115 having mounted thereon, an operating button 116 which may be actuated manually by an attendant at the reperforator. The keylever 115 is slidably mounted on the plate 12, being provided with a pair of slots 117—118 (Fig. 1) for receiving two headed pins 119 and 120 that are suitably fixed to the plate 12. A link 121 is pivotally attached to the keylever 115 and to one arm of a bellcrank lever 122 whereby, upon the keylever 115 being moved to the left, Fig. 1, the bell crank lever 122 will rock clockwise (Fig. 1) about a pivot pin 123 on which it is pivotally mounted. The bellcrank lever 122 is normally urged to rock in a counterclockwise (Fig. 1) direction about pivot pin 123 by a contractile spring 124 attached to the lever adjacent its upper end, thus normally to hold the keylever 115 and the mechanism actuated by the lever in the position shown in Fig. 1 and Fig. 2.

Pivotally attached to the upper end of the bellcrank lever 122, is a feed-out pawl 125 that is urged by a contractile spring 126 to rotate in a counterclockwise direction (Fig. 1) about its pivotal connection with the bellcrank lever 122. The feed-out pawl 125 has a notch 127, best seen in Fig. 3, formed in its lower surface for engaging a transversely extending projection 128 on a feed-out slide 129. The transversely extending projection 128 has a slot 130 formed in it for receiving the free end of the feed-out pawl 125.

When the keylever 115 is pushed to the left, Fig. 1, to the right, Fig. 2, the bellcrank lever 122 will be rocked clockwise as viewed in Fig. 1, counterclockwise as viewed in Figs. 2 and 3 to move the feed-out slide 129 from the position shown in Figs. 1 and 2 to the position shown in Fig. 3. The feed-out slide 129 is mounted for sliding movement on a pair of guide pins 131 and 132 that extend outwardly from a plate 133, slots 134 and 135 being formed in the feed-out slide 129 to receive the shanks of the pins 131 and 132, respectively. The feed-out slide 129 has a blade-like extension 140 that extends across the upwardly extending ends of all of the selector slide latches 45 and in close proximity to them. When the keylever 115 is depressed and the feed-out slide 129 is actuated thereby, the blade-like extension 140 will engage all of the selector slide latches to rock them clockwise as viewed in Fig. 1 or counterclockwise as viewed in Figs. 2 and 3. When the selector slide latches 45 are thus tripped, they will release their associated punch selector slides 50 and permit them to move under the influence of their associated springs 52 to the left as viewed in Figs. 2 and 3 to the right, Fig. 1, thus to prepare all the punches 15 for operation.

The feed-out slide 129 also has a laterally extending lip 141 formed on it which will engage the edge of the arm 68 of the four-armed trip lever 66, thus to trip the clutch 75 and thereby cause the shaft 88 to be oscillated first in a counterclockwise direction as viewed in Fig. 2, clockwise as viewed in Fig. 1, to actuate all the punches 15 and as the shaft 88 oscillates in the opposite direction to actuate the tape-feeding pawl 106 to feed the tape 94 one step after it has been punched by the punches 15.

From the foregoing, it is believed to be apparent that as long as the keylever 115 is held operated, the clutch 75 will be held tripped, and consequently, the gear 76 will continue to rotate, thereby to progressively step the tape 94 one step at a time past the punches and to cause the punches to punch all five holes in the tape. This condition will prevail so long as the keylever 115 is held operated and no signals are incoming to the reperforator. As soon as a signal is received in the reperforator, as pointed out hereinbefore, the selector cam sleeve 14 will start to rotate. The first operation effected as a consequence of the rotation of the selector cam sleeve 14 is the operation of the reset bail lever 25. The reset bail lever 25 has formed on it a feed-out pawl actuating extension 144 that extends through an aperture 145 in the plate 133 into position beneath the feed-out pawl 125. The bottom surface of the feed-out pawl has two levels, 146 and 147, the level 147 being recessed with respect to the level 146, whereby, when the feed-out pawl 125 is in the position shown in Fig. 3, the extension 144 will engage surface 146 and move the feed-out pawl 125 upwardly against the action of its spring 126, thereby to release the feed-out pawl 125 from engagement with the transversely extending projection 128 on the feed-out slide 129. When this occurs, the feed-out slide 129 will be moved to the position shown in Figs. 1 and 2 by the selector slide latches 45 and the bottom of the notch 127 will then rest under the bottom level 146 adjacent the free end of the feed-out pawl 125. When the feed-out pawl 125 is thus tripped to disengage the notch 127 in it from the transversely extending projection 128 of the feed-out slide 129 and the feed-out slide 129 is moved to the position shown in Figs. 1 and 2, the arm 68 will be released, and the tape feed-out with the punching of the "letters" code in the tape will be interrupted until the keylever 115 is released and re-operated during a period when no signals are coming into the apparatus.

When the apparatus is receiving the incoming signals and is operating under control of those signals, the operation of the reset bail lever 25 in each cycle of rotation of the selector cam sleeve 14 will cause the feed-out pawl actuating extension 144 to be moved upwardly, but due to the fact that the level 147 of the feed-out pawl 125 is recessed with respect to the level 146 the feed-out pawl 125 will not be actuated.

From the foregoing it is believed to be apparent that when no signals are coming in to the reperforator, the operation of the operating button 116 of keylever 115 will cause the tape to be fed out of the apparatus step by step and perforated with the "letters" code combination but that as soon as a signal is received over the line extending to the electromagnet 18, the feed-out mechanism will be disabled and will not resume operation until the key button 116 is released by the operator and re-operated at a period when no signals are coming into the apparatus.

While the apparatus has been described as applied to a reperforator of the type shown in the co-pending application of R. E. Arko and C. W. Swan, Serial No. 725,935, filed April 2, 1958, it will be understood that the feed-out mechanism which would not interfere with the receipt of incoming signals, could be adapted to use with other mechanisms and that various modifications of the apparatus could be made without departing from the scope of the invention.

What is claimed is:

1. In a printing telegraph signal controlled tape reperforator, tape feeding means for feeding the tape step-by-step through the reperforator, a trip lever for activating said feeding means, means for operating said trip lever, signal responsive selector means having a rest position and being operable upon signal responsive operation to actuate said operating means, a second means for operating said trip lever independently of said first mentioned operating means and when said selector means occupies its rest position, and means controlled by said selector means upon receipt therein of a signal for rendering said second trip lever operating means inoperable.

2. In a printing telegraph signal controlled tape reperforator, tape feeding means for feeding the tape step-by-step through the reperforator, a drive shaft, a clutch for connecting said feeding means with said shaft, a trip lever for rendering said clutch operative, means for operating said trip lever, signal responsive selector means having a rest positioned and being operable upon signal responsive operation to actuate said operating means, manually operable means for operating said trip lever independently of said selector means when said selector occupies its rest position, and means controlled by said selector means upon receipt therein of a signal for rendering said manually operable trip lever means inoperable.

3. In a printing telegraph signal controlled tape reperforator, tape feeding means for feeding the tape step-by-step through the reperforator including a clutch for driving said feeding means through one feeding cycle, a trip lever for activating said clutch, an operating lever for operating said trip lever, signal responsive selector means having a rest position and being operable upon signal responsive operation to actuate said operating lever, manually operable means for operating said trip lever independently of said operating lever and of said incoming signals and when said selector occupies its rest position, means actuated by said manually operable means for causing the reperforator to punch a predetermined code combination in the tape, and means controlled by said selector means for rendering said manually operable means inoperable in the presence of incoming signals.

4. In a printing telegraph signal controlled tape reperforator having permutatively settable punch enabling means, tape feeding means for feeding the tape step by step through the reperforator, a trip lever for activating said feeding means, signal responsive selector means for controlling said enabling means and for actuating said trip lever upon receipt therein of a signal, a slide for actuating said trip lever independently of said selector means, a manually operable pawl normally engaged with said slide for actuating said slide, and means controlled by said selector means upon receipt therein of a signal for disengaging said pawl from said slide to render the slide ineffective to actuate the trip lever.

5. In a printing telegraph signal controlled tape reperforator having permutatively settable punch enabling means, tape feeding means for feeding the tape step by step through the reperforator, a trip lever for activating said feeding means, signal responsive selector means for actuating said trip lever upon receipt therein of a signal, means operable independently of incoming signals for activating said trip lever, said independently operable means including a manually operable lever, a pawl for actuation by said lever and a slide engageable and operable by said pawl for setting said punch enabling means and for operating said trip lever, and means controlled by said selector means for rendering ineffective said independently operable means.

6. In a printing telegraph signal controlled tape reperforator having permutatively settable punch enabling means, tape feeding means for feeding the tape step by step through the reperforator, a trip lever for activating said feeding means, signal responsive selector means for actuating said trip lever upon receipt therein of a signal, means operable independently of incoming signals for activating said trip lever, said independently operable means including a manually operable lever, a pawl for actuation by said lever and a slide engageable and operable by said pawl for setting said punch enabling means and for operating said trip lever, and means actuated by said selector means for disengaging said pawl from said slide to render ineffective said independently operable means.

7. In a perforator having a signal controlled selector mechanism, a plurality of interposer members premutatively selectable for operation by said mechanism, a punch individual to each interposer, a punch actuator for actuating any selected interposer to cause the interposer to actuate its associated punch, a tape feeding means operable to feed tape one increment each time the punch actuator is operated, and a tape feed-out mechanism comprising a feed-out lever, a pawl connected to said feed-out lever for actuation thereby, a feed-out slide for engagement and actuation by said pawl, means on said slide for initiating operation of said feeding means and punch actuator and a second means on said slide for activating said interposer members independently of the selector mechanism.

8. In a perforator having a signal controlled selector mechanism, a plurality of interposer members permutatively selectable for operation by said mechanism, a punch individual to each interposer, a punch actuator for actuating any selected interposer to cause the interposer to actuate its associated punch, a tape feeding means operable to feed tape one increment each time the punch actuator is operated, and a tape feed-out mechanism comprising a feed-out lever, a pawl connected to said feed-out lever for actuation thereby, a feed-out slide for engagement and actuation by said pawl, means on said slide for initiating operation of said feeding means and punch actuator, a second means on said slide for activating said interposer members independently of the selector mechanism and means actuated by said selector mechanism when said mechanism receives a signal for disengaging the pawl from the slide.

References Cited in the file of this patent

UNITED STATES PATENTS 2,330,250 Sylvester ........ Sept. 28, 1943
2,862,055 Swan ........ Nov. 25, 1958